United States Patent [19]

Nissan

[11] 4,156,175

[45] May 22, 1979

[54] VOLTAGE REGULATION APPARATUS USING SIMULATED FERRORESONANCE

[75] Inventor: Itzhak Nissan, Seattle, Wash.

[73] Assignee: Ratelco, Inc., Seattle, Wash.

[21] Appl. No.: 845,493

[22] Filed: Oct. 26, 1977

[51] Int. Cl.[2] .......................... G05F 1/64; H02M 13/26

[52] U.S. Cl. .......................................... 323/60; 363/75

[58] Field of Search .................. 323/6, 60, 61; 363/75

[56] References Cited

U.S. PATENT DOCUMENTS

| | | | |
|---|---|---|---|
| 3,573,606 | 4/1971 | Hart et al. | 323/60 |
| 3,818,314 | 6/1974 | Bishop et al. | 363/75 |
| 3,914,685 | 10/1975 | Van Gilder | 363/75 |
| 4,030,025 | 6/1977 | Kakalec | 363/75 |

OTHER PUBLICATIONS

*IEEE Trans. Magnetics*, vol. MAG 7, No. 3, Sep. 1971 pp. 571-574.

*Primary Examiner*—Gerald Goldberg
*Attorney, Agent, or Firm*—Christensen, O'Connor, Johnson & Kindness

[57] ABSTRACT

An amplitude-regulated, distortion-free sine wave voltage source capable of operating from input sine waves, square waves or quasi-square waves, this ferroresonance-simulating inverter apparatus includes a special control winding and shorting switch therefor that is cyclically operated by a control circuit. By varying the point of time during each half cycle at which the control winding becomes short circuited in accordance with cyclic comparisons being made between recurring voltage ramps and an error signal related to system output voltage level, a feedback loop is provided to regulate such output voltage. The transformer secondary is not required to operate in the saturated mode through use of a ferroresonant capacitor in the usual manner, but the effect of ferroresonance is simulated to achieve regulation through the shunting of flux to saturate separate core shunts in a small fraction of the total core. Further reductions of harmonic distortion are attained by incorporating harmonic wave traps in the output permitted by utilizing secondary reactance resonant tuning to the harmonic now made possible by obviating the need for ferroresonance at the fundamental frequency.

7 Claims, 4 Drawing Figures

VOLTAGE REGULATION APPARATUS USING SIMULATED FERRORESONANCE

BACKGROUND OF THE INVENTION

This invention relates to an improved regulated alternating voltage source utilizing the effects obtained by ferroresonant transformers without their usual disadvantages. A general object hereof is to provide a low-cost, efficient, alternating current source that is tightly regulated and the output amplitude of which can be selectively adjusted. A related object is to provide such a power source that produces a substantially distortionless sine wave output and that responds rapidly in its regulating function to load changes and primary voltage changes.

The invention is herein illustratively described in its presently preferred embodiment; however, it will be recognized that certain modifications and changes with respect to details may be made without departing from the essential features thereof.

Ferroresonant voltage regulators are old in the art. Discussions of the operating principles of such systems occur, for example, in the following prior art reference materials:

Electronic Products, Dec. 1966, p. 58, et seq.
Electronic Products, Jan. 1967, p. 74, et seq.
IEEE Transactions on Magnetics, Vol. Mag-6, No. 1, March 1970, p. 4, et seq.
IEEE Transactions on Magnetics, Sept. 1971, pp. 571, et seq.
IEEE Transactions on Magnetics, Vol. Mag-7, No. 1, March 1971
IEEE Transactions on Magnetics, Sept. 1971, pp. 567, et seq.
U.S. Pat. No. 3,525,035, Aug. 18, 1970, R. J. Kakalec
U.S. Pat. No. 3,573,605, Apr. 6, 1971, H. P. Hart, et al
U.S. Pat. No. 3,573,606, Apr. 6, 1971, H. P. Hart, et al The conventional open loop ferroresonant inverter comprises a ferroresonant transformer and a resonant circuit that, in conjunction with leakage reactance and a tuned filter, performs both the alternating voltage regulation and harmonic filtering functions. The circuit may also include a third transformer winding for cancellation of third harmonics in the output. Primary voltage may be either a sine wave, square wave or modified (quasi) square wave. While such inverters are comparatively simple, harmonic distortion is typically 5% or more, especially at high output voltage and light loading. Use of current feedback for regulation purposes increases output wave distortion, particularly when the primary voltage is a square wave or quasi-square wave. Since that portion of the transformer core within the resonating and output windings is saturated, filtering to reduce output wave distortion is difficult to achieve. This is especially so if operating efficiency is not to be materially reduced.

Furthermore, the degree of voltage regulation attained with such open loop ferroresonant inverters is insufficient for many applications even with constant load impedance. Regulation is considerably worse when variation in both input voltage and load are considered. In general transient performance is relatively poor since the open loop depends on high energy storage to perform its various functions. Fixed by the transformer characteristics and resonating capacitor value, current limiting is not adjustable in such inverter systems.

From stability considerations, the open loop ferroresonant transformer requires small air gaps in the magnetic shunts between primary and secondary. Thus, in order to assure operation above the knee of the B-H curve, circulating current in the resonant winding must be high, in turn requiring a large resonating capacitor and a bulky secondary winding.

In accordance with the present invention voltage regulation within $\pm\frac{1}{2}\%$ under all practical operating conditions of line voltage variations and load variations is achieved whether these variations occur separately or simultaneously. Moreover, substantially distortionless sine wave output voltage, improved transient response, widely adjustable output voltage and higher efficiency are all attainable with apparatus requiring a ferroresonant capacitor less than half the size and only 70% of the winding copper and transformer core material required for the nearest comparable open loop type ferroresonant inverter. Further the improved inverter of this invention produces much less electromagnetic field interference in surrounding regions than conventional ferroresonant inverters. Utilizing a simple magnetic structure along with the other savings mentioned, the improved inverter also costs materially less to build.

BRIEF DESCRIPTION OF THE INVENTION

In this novel ferroresonance-simulating AC power source sinusoidal output voltage is regulated by means including a separate control winding wound on a portion of the transformer core beyond that carrying primary and secondary. The primary and secondary are partially decoupled by an intervening core shunt. A ferroresonant capacitor across the secondary elevates flux level in the secondary to achieve the desired level of secondary voltage, but with use of a capacitor value a small fraction of the size used in the open loop systems. A second core shunt herein referred to as the control shunt is situated between the second and control windings. Cyclic shorting of the control winding by solid state switch operated by a control circuit forces flux linked with the secondary to pass through the control shunt. Synchronized with alternating voltages of the primary and secondary during each half cycle, this shorting or control period is automatically varied in duration in response to changing secondary voltage. The control period starts earlier or later in the secondary voltage half cycles as the secondary voltage tends to rise above or drop below a preset reference or regulated value.

The aforementioned regulating action controlling the flux swings in the secondary core automatically adjusts the secondary flux density to a regulated value within the non-saturation range of its B-H curve determined by the preset reference voltage employed in the control circuit. Although coupling between primary and secondary is loosened by an interposed core shunt as with conventional ferroresonant regulator transformers, the regulating action in this system does not depend upon utilizing this shunt for saturating the secondary core. Instead only a relatively small portion of the core (the control shunt and adjoining core legs) becomes saturated, so that core losses are considerably reduced below those in open-loop inverters.

Since the secondary portion of the core is thus permitted to operate in the non-saturated portion or below the knee of its B-H characteristic, harmonic distortion and electromagnetic radiation effects are reduced. Further reductions of harmonic distortion in the secondary output are effected by an L-C resonant filter serving as a harmonic trap, so as to filter out the third harmonic (or higher order harmonics) in the output secondary circuit, with the ferroresonant capacitor(s) serving also as the filter capacitance for this purpose.

In effect, therefore, the control circuit regulates the secondary voltage in a manner simulating ferroresonance, but without most of the limitations and disadvantages thereof. It thus becomes possible to efficiently produce a substantially undistorted output sine wave at any of widely different regulated values, at low apparatus cost and by means capable of accommodating widely changing input voltages and varying load demands, not only for input voltages of sinusoidal form, but also for those of square wave or quasi-square wave forms.

These and other features, objects and advantages of the invention will be recognized from the following more detailed description of the preferred embodiment.

DETAILED DESCRIPTION OF THE PREFERRED EMBODIMENT

Figure 1:
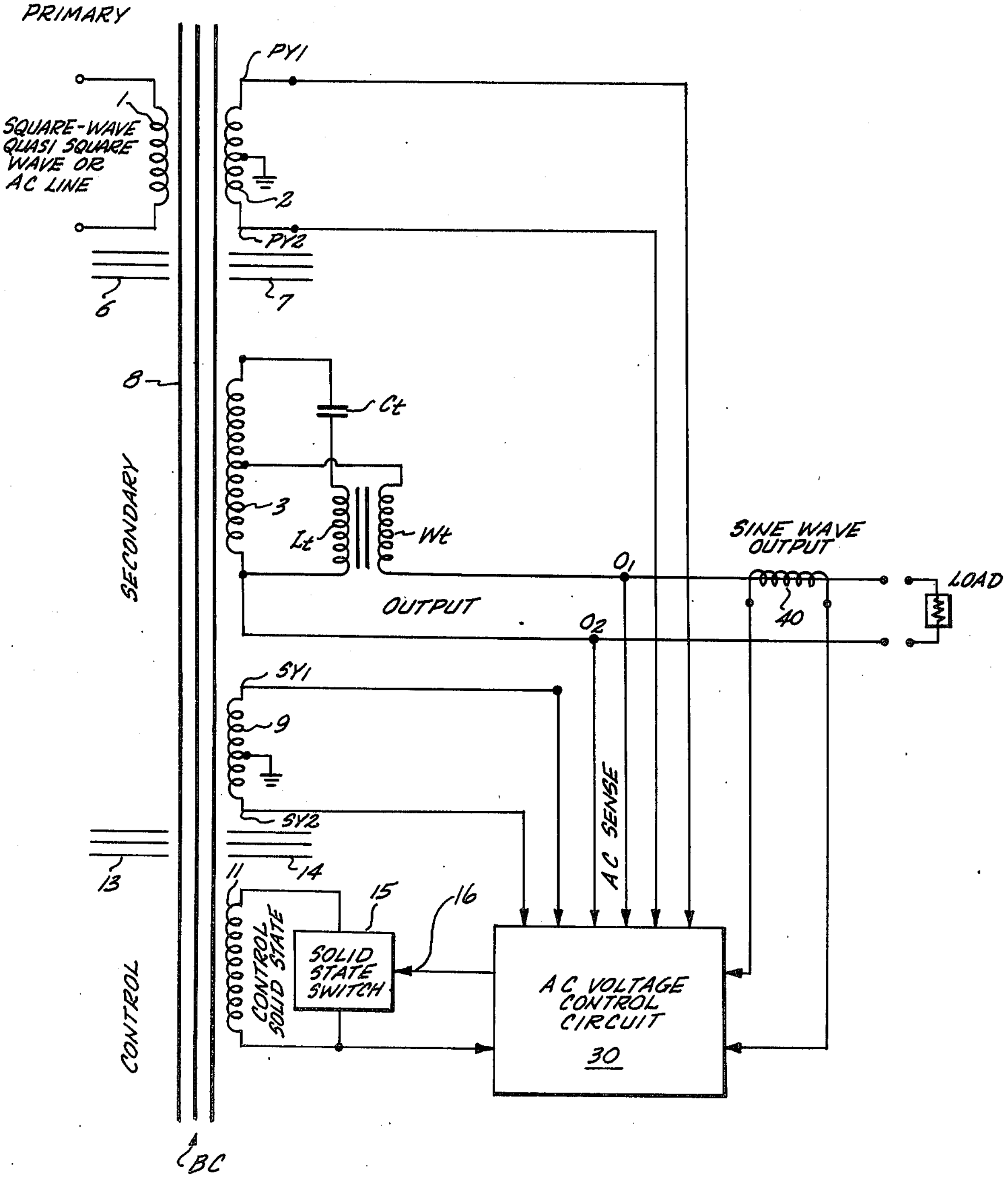
FIG. 1 is a simplified diagram of the improved regulating inverter.
Figure 2:
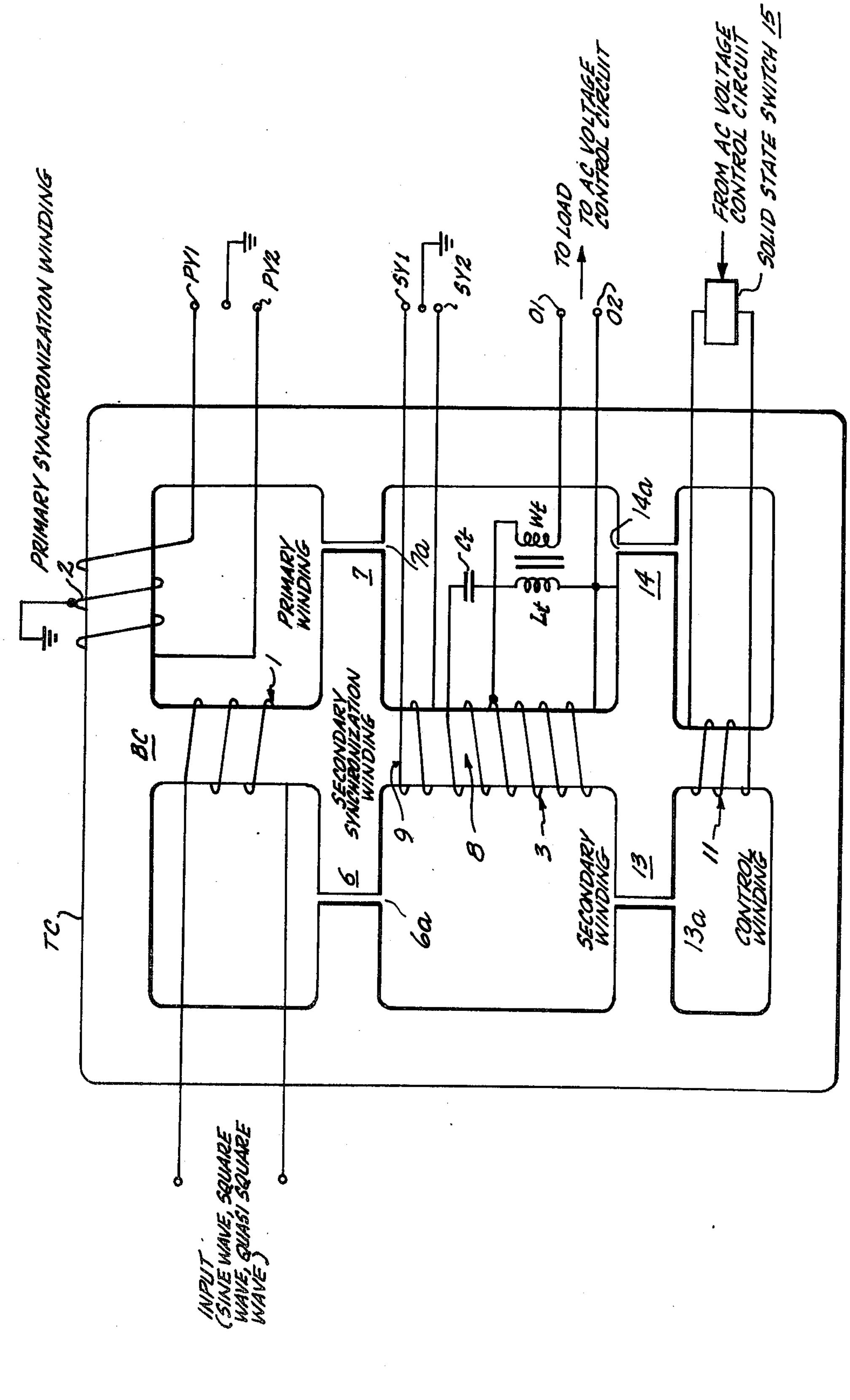
FIG. 2 depicts a typical winding arrangement for the modified transformer used.

Referring to FIGS. 1 and 2, the system includes a transformer having a main core loop bridged by central leg BC that extends successively through primary winding 1, then secondary winding 3 and finally control winding 11. The portion 8 under secondary 3 is also encircled by a secondary synchronization winding 9. The main core loop TC or the portion of bridge BC that passes through primary 1 also carries a primary synchronization winding 2. Core shunts 6, 7 bridge between the main core loop TC and a region of central core leg BC situated between primary and secondary. A second set of core shunts 13, 14 similarly bridge between main core loop TC and a region of central core leg BC situated between the secondary and control windings 3 and 11. Air gaps 6*a* and 7*a* are provided in, respectively, core shunts 6 and 7, while air gaps 13*a* and 14*a* are provided in, respectively, core shunts 13 and 14. Shunts 6, 7 partially decouple or loosen the coupling between primary and secondary to permit independence and thus controllability of load voltage in a manner generally simulating an open loop ferroresonant regulator. However, in contradistinction to the open loop regulator this invention utilizes a larger gap in the primary-secondary shunt 6, 7 which thereby places a reduced requirement for degree of contribution by the ferroresonant capacitor $C_t$ to achieve desired levels of secondary voltage. The secondary core 8 need not be saturated by the ferroresonance flux in this case, which now makes possible controllability of secondary voltage by control of average flux level in the secondary. In consequence the ferroresonant condenser may be relatively small, controllability to achieve rapid response to control or regulating follow-up action enhanced, and core losses reduced. Shunts 13 and 14 serve in that unique process in response to controlled short circuiting of the control winding 11 as will later more fully appear. Primary synchronization winding 2 has two output lead PY1 and PY2 producing phase-opposed AC signals relative to a central ground that are synchronous with the input or primary AC energizing wave. Secondary synchronization winding 9 likewise has two output leads SY1 and SY2 producing phase-opposed AC signals relative to a central ground that are synchronous with the AC voltage induced in the secondary 3.

A third harmonic trap in the form of a series resonant L-C circuit tuned to the third harmonic of the fundamental input frequency is connected across secondary 3. This circuit includes capacitor $C_t$ and inductance $L_t$. However, selection of the value of $C_t$ (with the value of $L_t$ being separately but later selected) is governed by ferroresonance requirements of the circuit. Those requirements are based on the power to be delivered by the secondary and the range of control that is to be experienced by the control portion of the system. The inductance $L_t$ of this third harmonic resonant circuit is magnetically linked to a transfer winding $W_t$ connected serially in one of the output leads, $O_1$, from an intermediate point between the ends of winding 8. The inductance of winding $W_t$ also serves to affect suppression of higher order harmonics. While the system in other respects operates in a manner tending to deliver a sine wave output, this conventional tuned filter arrangement further reduces output wave distortion attributable to third harmonic voltage components. Filters tuned to 5th or 7th harmonics, for example, may be added if desired.

Figure 3:
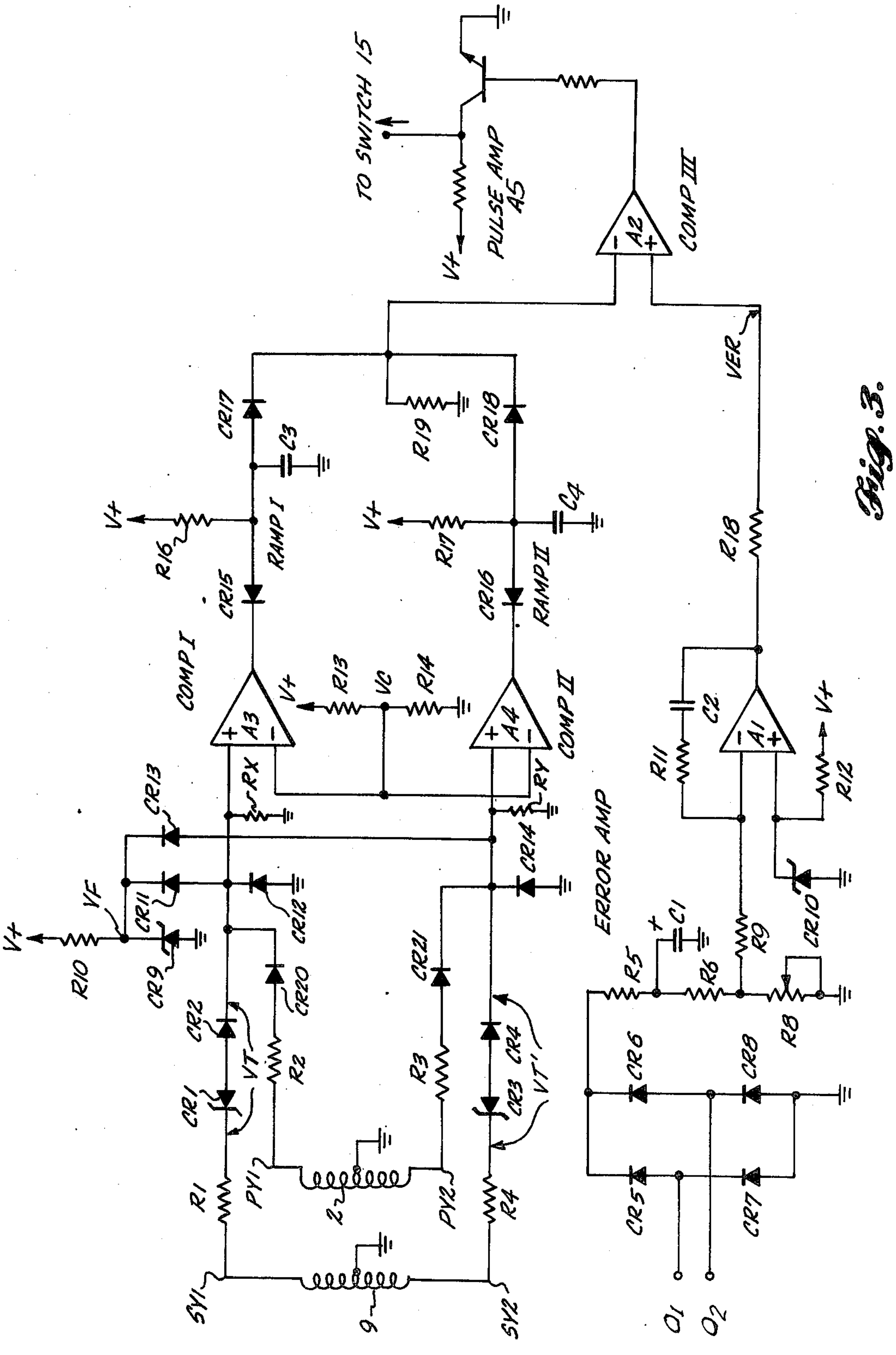
FIG. 3 is a control circuit schematic.

In general terms, referring to FIG. 1, solid state switch 15 is turned on (i.e., closed) to short circuit control winding 11 in response to a signal from the AC voltage control circuit 30 (FIG. 3). This is made to occur at the same identical point on each succeeding half cycle for the same operating conditions so as to maintain output wave form symmetry from the system. As will hereinafter be described in greater detail, the control circuit operates to perform this function in cyclical manner on each half cycle for a control interval that is automatically varied so as to regulate output voltage in response to synchronizing signals from both windings 2 and 9. The control interval starting time each half cycle is varied on the basis of a comparison being repeatedly made between a ramp voltage and an error voltage $V_{ER}$ related to output voltage across output leads $O_1$ and $O_2$. One optional feature shown in FIG. 1 but not in FIG. 3 is the provision of a current transformer 40 linked with an output lead ($O_1$) and connected with the control circuit to effect load current limiting also by varying the starting time hence the duration of the control interval. Referring to FIG. 3, the AC voltage control circuit includes two identical ramp generators comprising the resistor-condenser combinations $R_{16}$, $C_3$ and $R_{17}$, $C_4$, respectively. The respective ramps are activated on alternate half cycles of the primary source voltage and compared in comparator $A_2$ with error voltage $V_{ER}$ so as to vary the point of time during each of the primary half cycles at which the shorting switch 15 is closed in accordance with variations in such error voltage.

In order to produce the required error voltage $V_{ER}$ for this last-mentioned function output voltage across leads $O_1$, $O_2$ is applied to a full-wave rectifier comprising rectifiers $CR_5$, $CR_6$, $CR_7$ and $CR_8$ having an averaging circuit including series resistor $R_5$ and capacitor $C_1$. Capacitor voltage is applied across a voltage divider including series resistors $R_6$ and $R_8$ delivering its output through resistor $R_9$ to one input (the negative input) of error amplifier $A_1$. Resistor $R_8$ is made variable as a convenient means to vary error voltage, hence regulated output voltage of the system. Error amplifier has an operational network consisting of series resistor $R_{11}$ and capacitor $C_2$ connected between its output and its negative sensing input terminal. Reference voltage applied to the opposite or positive input terminal of amplifier $A_1$ is derived from the junction between zener diode $CR_{10}$ and series resistor connected across a source of reference V+. Output error voltage from amplifier $A_1$ is thus directly proportional to time averaged system output voltage which is equivalent to the RMS value of the output voltage for low harmonic content in the AC voltage, multiplied by an adjustment factor determined by the setting of $R_8$. Other embodiments may have an error amplifier which consists of an RMS converter where extreme precision is required. Although denominated "error voltage" the output of amplifier $A_1$ in reality is more properly a system output-related voltage that is applied through resistor $R_{18}$ to the positive input side of voltage comparator $A_2$ as a reference to be compared with the alternately generated ramps previously mentioned.

Turning now to the generation of such ramps (see FIGS. 3 and 4), the control circuit includes an arrangement by which one ramp, such as that developed on integrating capacitor $C_3$, is initiated by "closing" or clamping operation of a voltage sensitive switch amplifier $A_3$. This occurs at the instant primary synchronization voltage (PY1) reaches a certain value during the inception of one half cycle. Likewise the succeeding alternate ramp is developed on the counterpart integrating capacitor $C_4$ by closing of voltage sensitive switch amplifier $A_4$ at the corresponding instant during inception of the succeeding half cycle of opposing synchronization voltage (PY2). The arrangement further assures that switch amplifiers $A_3$ and $A_4$ cannot be closed except in turn on their respective alternate half cycles of primary voltage.

In order to perform these functions corresponding first or negative input terminals of each of amplifiers $A_3$ and $A_4$ are commonly connected to a source of fixed potential $V_c$, at the junction of series resistances $R_{13}$, $R_{14}$ that are connected across a source of fixed voltage V+. The opposing second or positive input terminals of amplifiers $A_3$ and $A_4$ are commonly connected through the respective diodes $CR_{11}$ and $CR_{13}$ to a point of clamp potential $V_F$ provided at the junction between resistor $R_{10}$ and zener diode $CR_9$ which are connected across a source of fixed voltage V+. In addition, such second input terminal of amplifier $A_3$ is connected through series diode $CR_2$, zener diode $CR_1$ and current limiting resistor $R_1$ to one side (SY1) of secondary synchronizing winding 9; also through diode $CR_{20}$ and current limiting resistor $R_2$ to one side (PY1) of primary synchronizing winding 2. In like manner the corresponding second input terminal of $A_4$ is connected through diode $CR_4$, zener diode $CR_3$ and resistor $R_4$ to the opposite side (SY2) of secondary synchronizing winding 9; also through diode $CR_{21}$ and resistor $R_3$ to the second side (PY2) of winding 2. Resistor $R_x$ connected from ground to the second input terminal of $A_3$ references this terminal to ground potential when diodes $CR_2$, $CR_{11}$, $CR_{13}$ and $CR_{20}$ are reversed biased. Resistor $R_y$ performs a similar function for the second input terminal of $A_4$.

Diode $CR_{15}$ interposed in series between the output of $A_3$ and the ramp circuit $R_{16}$, $C_3$ provides a low impedance coupling for rapid discharge of ramp capacitor $C_3$ to a low voltage state when $A_3$ becomes conductive so as to end the ramp generating function every other half cycle. Diode $CR_{16}$ similarly connected between $A_4$ and $C_4$ performs a similar role for the latter on the alternate half cycles.

The second or negative input of comparator amplifier $A_2$, that is the input opposed to that receiving error voltage $V_{ER}$, is similarly connected through isolating diodes $CR_{17}$ and $CR_{18}$ to the respective ramp integrating capacitors $C_3$ and $C_4$. These isolating diodes, also commonly grounded through resistor $R_{19}$, permit the ramps to overlap in time without the integrating circuit voltage of either ramp circuit affecting that of the other. Output from comparator $A_2$ is amplified in pulse amplifier $A_5$ for operating the shorting switch 15. This switching action occurs each time the linearly changing ramp voltage level being applied to one input of comparator $A_2$ rises to the value of error voltage $V_{ER}$ then existing on the positive input of comparator $A_2$.

Figure 4:
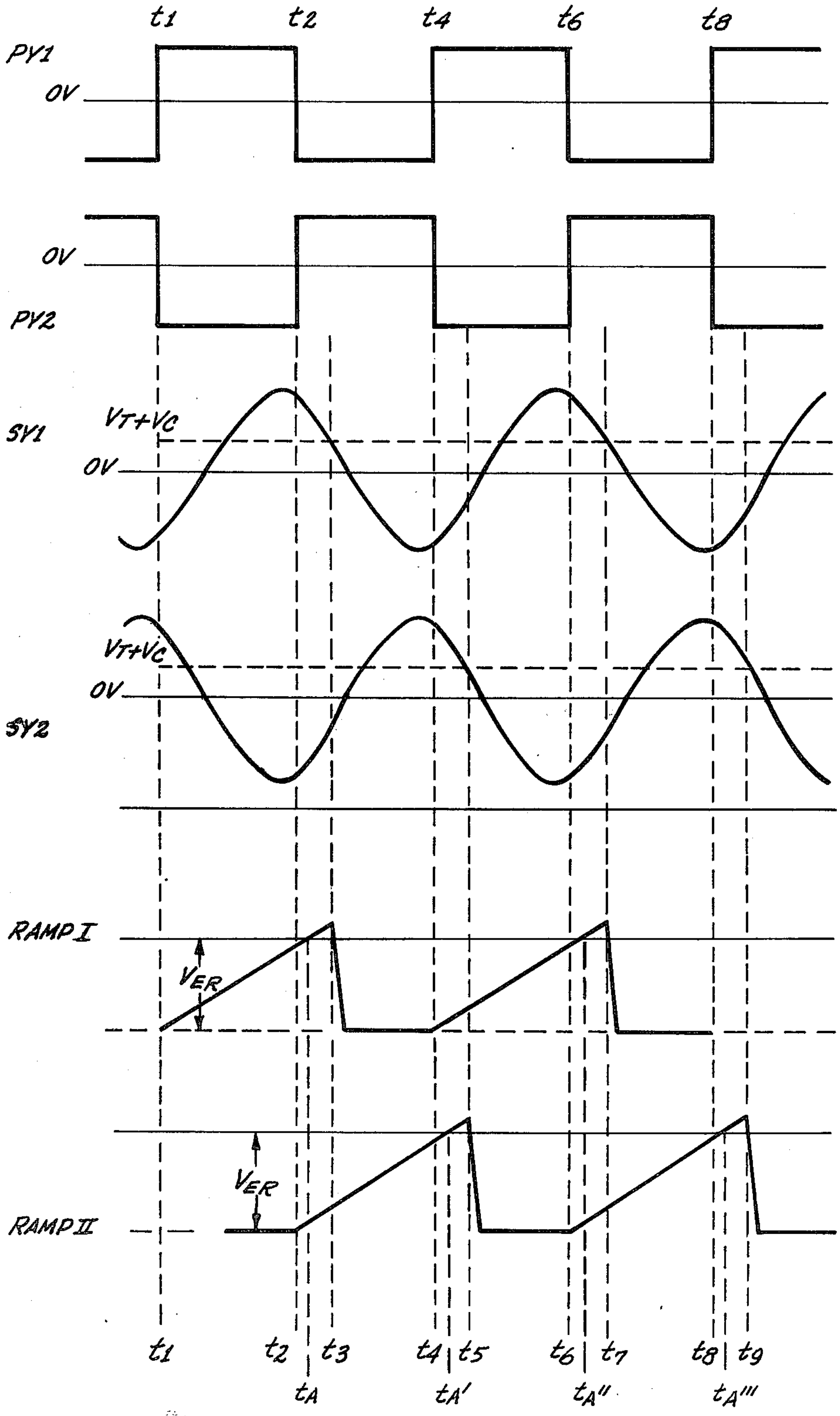
FIG. 4 is a wave diagram for the control circuit.

In operation of the AC voltage control circuit let it be assumed a square wave input voltage is to be converted to a voltage regulated sine wave across output leads $O_1$, $O_2$, with successive half-cycle periods represented by the equal time intervals $t_1$ to $t_2$, $t_2$ to $t_4$, $t_4$ to $t_6$, $t_6$ to $t_8$, etc., (FIG. 4). Depending upon load magnitude and load power factor the phase-opposed primary synchronization signals PY1 and PY2 and the phase-opposed secondary synchronization signals SY1 and SY2 may appear with the relative phasing depicted in FIG. 4. At time $t_1$, with PY1 passing from negative to positive, the positive input of comparator $A_3$, which had been reversely biased by SY1 through $CR_2$, is now forced to become positive. PY1, now exceeding clamp voltage $V_F$, is applied directly to the positive input of comparator $A_3$. This arrangement, the same for both ramp circuits, insures that the respective ramps will start at the same voltage threshold during each of the successive half cycles of primary voltage.

The comparator $A_3$ is a bistable or switching type amplifier that switches to the positive state when PY1 causes the positive input of $A_3$ to exceed $V_c$. Thus cut off from its normal clamping path through diode $CR_{15}$, integrating capacitor $C_3$ starts to charge through resistor $R_{16}$, producing the rising ramp function (Ramp I, FIG. 4). A second ramp function (Ramp II) is started in like manner with the inception of the succeeding positive half cycle of PY2. The Ramp I function is reset or terminated at time $t_3$ after the end of the positive half cycle PY1. Its termination is thus effected under conditions with PY1 now negative and SY1 positive, with the noninverting or positive input of $A_3$, therefore, also positive. Under these conditions at the instant SY1 drops to less than the sum of $V_c$ plus $V_t$ (i.e., $V_t$ is the sum of the voltage drops across $CR_1$ and $CR_2$) the comparator $A_3$ will restore the clamp circuit voltage connection to capacitor $C_3$ causing the latter to instantly discharge, thereby terminating or resetting the Ramp I function. The Ramp II function is terminated on the succeeding half cycle in like manner and by the counterpart circuits described and illustrated.

During each ramp, its increasing voltage value is continuously being compared with that of the existing value of error reference voltage $V_{ER}$. The instant during a half cycle these two voltages become equal (at times $t_A$) comparator responds to deliver an output pulse that is amplified in $A_5$, causing shorting switch 15 to close.

As previously indicated closure of shorting switch 15 causes short circuit current to flow in control winding 11. This in turn forces flux in core leg section 8 to saturate shunts 13, 14 and the adjoining portions of main core loop TC and thereby alters the rate of flux charge through core leg section 8. Depending on how early or late this occurs on each succeeding half cycle, the output voltage of the system is thus depressed more or less so as to maintain it at the preselected regulated value. However, with proper design the portion of the core that becomes saturated need only be a small portion of the total core, thus keeping transformer losses small.

As will be recognized, the system operates in the same manner for inputs of quasi-square wave forms and sine wave form. In each situation the regulatory ramp functions are under control of both primary and secondary voltages and are symmetrical on the succeeding half cycles during which the alternately sequential ramps are generated. In other words, for a given value of reference error voltage $V_{ER}$ the intervals $t_1$ to $t_A$, $t_2$ to $t_{A'}$, $t_4$ to $t_{A''}$, $t_6$ to $t_{A'''}$, etc., are all equal, as equal they must be to assure steady stable regulation. Moreover, it is also essential that each ramp be synchronized to both primary and secondary due to the fact that phase angle between primary and secondary is a function of load magnitude and load power factor, also due to the possibility that loading may vary abruptly or in steps even for half cycle intervals. The system of control herein disclosed accommodates these variables as well as variations in input voltage.

The invention thus provides an adjustable output, voltage regulated sine wave voltage source with low distortion that can be further reduced by suitable filtering and that achieves this result efficiently at relatively low apparatus cost. These and related advantages will be evident as will the fact that design modifications and variations are possible within the scope of the novel subject matter as set forth in the claims that follow.

The embodiments of the invention in which an exclusive property or privilege is claimed are defined as follows:

1. Apparatus to produce regulated alternating voltage substantially of undistorted sinusoidal waveform operable from an alternating input voltage, said apparatus comprising a transformer including a core having non-saturating successively contiguous sections respectively carrying primary, secondary and control windings, whereby said alternating input voltage applied to said primary winding results in alternating voltages induced in said secondary winding and said control winding by magnetic flux passing in common through said primary, secondary and control winding core sections, ferroresonance capacitor means connected across said secondary winding and selected of a size to produce ferroresonance in the secondary winding core section without saturating the same, output circuit means coupled to said secondary winding for producing an output voltage, at least one harmonic filter means in said output circuit means including said capacitor means and choke means operable to further reduce harmonic content in said output voltage, said core having a main decoupling shunt between said primary and secondary windings and a control shunt between said secondary and control wingings, a control circuit, means applying to said control circuit operating voltages, one of which is proportional to the voltage of said secondary winding and a second of which is synchronously phased with relation to at least one of said alternating input and secondary winding voltages, said control circuit producing a control signal on successive half cycles of said input voltage the timing of which is controlled by amplitude of said secondary winding voltage, and switch means operated cyclically by said control signal and connected to shunt said control winding with a low impedance to reduce the rate of flux change in the control winding core section for a portion of each half cycle period that varies with variations in said secondary winding voltage amplitude, operation of said switch means thereby forcing magnetic flux in said secondary winding core section to pass through the control shunt and causing variation in the rate of change of the flux density in the core section carrying said secondary winding.

2. The apparatus of claim 1 wherein the choke means are selected to resonate with said capacitance means for at least one harmonic frequency relative to said alternating voltage.

3. The apparatus of claim 2 wherein the control circuit includes means synchronized with the half cycles of at least one of said alternating voltages to initiate timing voltage variations with each such half cycle, error circuit means deriving a time-averaged voltage proportional to the voltage of said output circuit, and voltage comparator means operable to derive said control signal based on comparison of the successive varying timing voltage variations with said time-averaged voltage.

4. The apparatus of claim 3 wherein the error circuit includes means to produce an adjustively variable voltage from said time-averaged voltage for application to said voltage comparator means for selectively varying the regulated value of apparatus output voltage.

5. The apparatus of claim 1 wherein the control circuit includes means to initiate timing voltage variations with each of said successive cycles, error circuit means deriving a time-averaged voltage from voltage of said output circuit, and voltage comparator means operable to derive said control signal based on comparison of the changing values of said successive timing voltage variations with said time-averaged voltage.

6. The apparatus of claim 5 wherein the error circuit includes means to produce an adjustively variable direct voltage from said time-averaged voltage for application to said voltage comparator means for selectively varying the regulated value of apparatus output voltage.

7. The apparatus of claim 6 wherein the control circuit includes means to initiate the successive timing voltage variations in response to a predetermined value of corresponding half cycles of primary winding voltage and to terminate and reset such timing voltage variations in response to predetermined value change of secondary winding voltage.

* * * * *